United States Patent [19]
Erpelding et al.

[11] Patent Number: 5,875,071
[45] Date of Patent: Feb. 23, 1999

[54] PLANAR HGA FOR PICO/NANO SLIDER

[75] Inventors: A. David Erpelding; Darrell Dean Palmer; Surya Pattanaik; Oscar Jaime Ruiz, all of San Jose, Calif.

[73] Assignee: International Business Machines Corporation, Armonk, N.Y.

[21] Appl. No.: 873,264

[22] Filed: Jun. 11, 1997

Related U.S. Application Data

[63] Continuation of Ser. No. 618,673, Mar. 19, 1996, abandoned.

[51] Int. Cl.⁶ ........................................................ G11B 5/48
[52] U.S. Cl. .............................................................. 360/104
[58] Field of Search .............................. 360/97.01, 98.01, 360/103–106, 108

[56] References Cited

U.S. PATENT DOCUMENTS

| | | | |
|---|---|---|---|
| 4,724,500 | 2/1988 | Dalziel | 360/103 |
| 4,761,699 | 8/1988 | Ainslie | 360/103 |
| 4,797,763 | 1/1989 | Levy et al. | 360/104 |
| 4,996,623 | 2/1991 | Erpelding et al. | 360/104 |
| 5,126,904 | 6/1992 | Sakurai | 360/104 |
| 5,185,683 | 2/1993 | Oberg et al. | 360/104 |
| 5,187,625 | 2/1993 | Blaeser et al. | 360/104 |
| 5,208,712 | 5/1993 | Hatch et al. | 360/98.01 |
| 5,245,489 | 9/1993 | Kimura et al. | 360/104 |
| 5,268,806 | 12/1993 | Goubau et al. | 360/113 |
| 5,339,208 | 8/1994 | Yumura et al. | 360/104 |
| 5,367,420 | 11/1994 | Yagi et al. | 360/104 |
| 5,391,842 | 2/1995 | Bennin et al. | 360/104 |
| 5,392,179 | 2/1995 | Sendoda | 360/104 |
| 5,491,597 | 2/1996 | Bennin et al. | 360/104 |
| 5,526,205 | 6/1996 | Aoyagi et al. | 360/104 |
| 5,530,604 | 6/1996 | Pattanaik | 360/104 |
| 5,657,186 | 8/1997 | Kudo et al. | 360/104 |
| 5,666,717 | 9/1997 | Matsumoto et al. | 29/603.12 |
| 5,680,274 | 10/1997 | Palmer | 360/104 |
| 5,731,931 | 3/1998 | Goss | 360/104 |

FOREIGN PATENT DOCUMENTS

| | | |
|---|---|---|
| A 0 121 057 | 10/1984 | European Pat. Off. . |
| A 0 338 698 | 10/1989 | European Pat. Off. . |
| A 0 434 261 | 6/1991 | European Pat. Off. . |
| 0 487 914 A2 | 6/1992 | European Pat. Off. . |
| 59-207065 | 11/1984 | Japan . |
| 63-149889 | 6/1988 | Japan ............... 360/104 |
| 2 193 833 | 2/1988 | United Kingdom ........ 360/104 |

*Primary Examiner*—Jefferson Evans
*Attorney, Agent, or Firm*—Michael N. Meller

[57] ABSTRACT

A head gimbal assembly is provided using a laminated load beam with electrical conductors etched in a copper layer of the load beam. A stiffening member is provided attached to the laminated load beam, the stiffener member being capable of being fabricated into a desired shape by a stamping process.

2 Claims, 6 Drawing Sheets

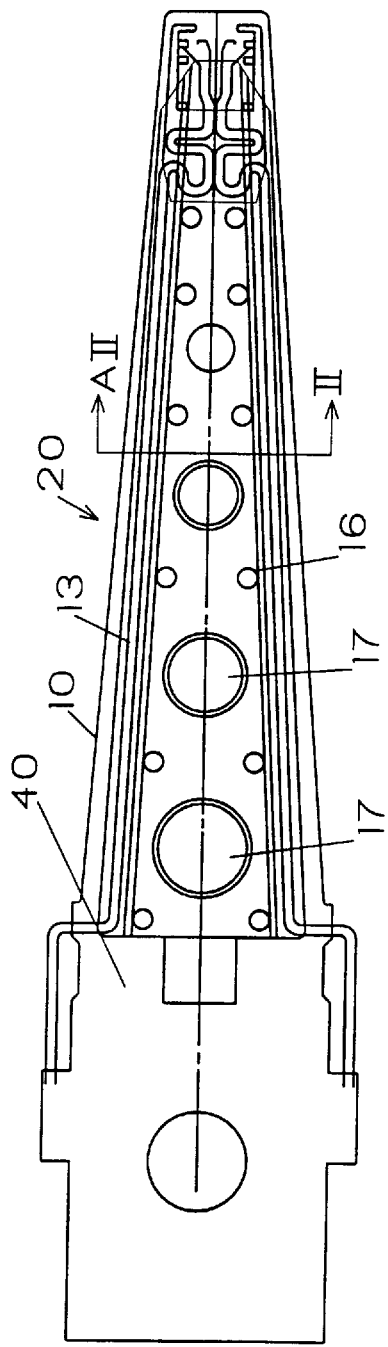
FIG. 1(A)
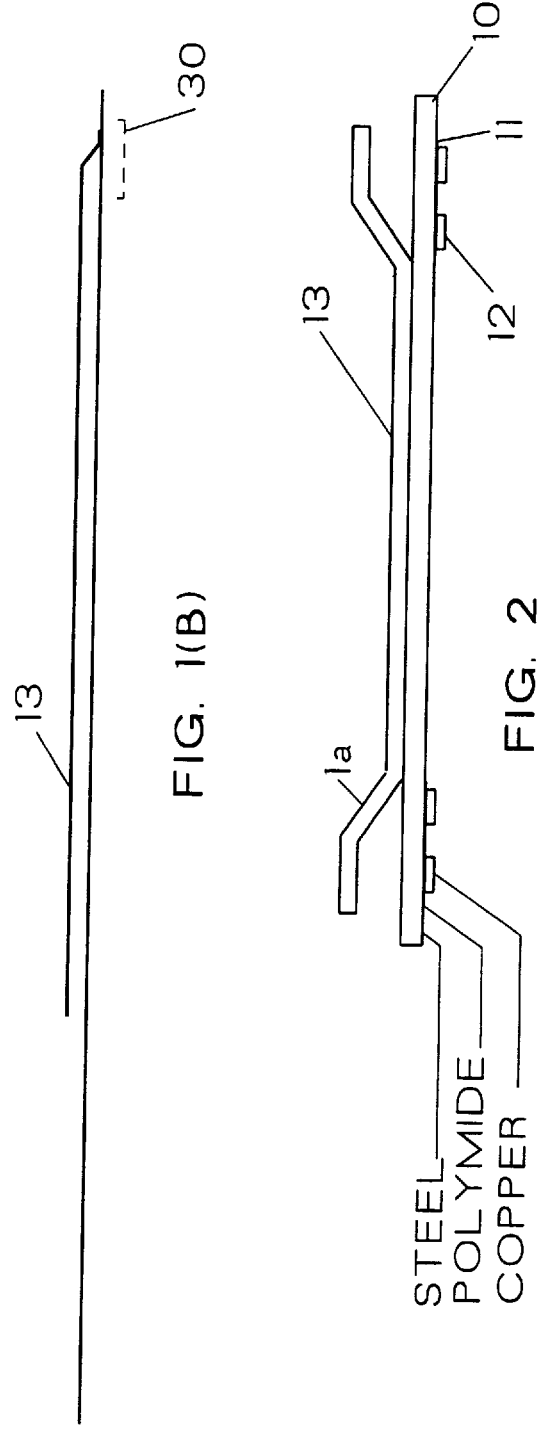
FIG. 1(B)
FIG. 2

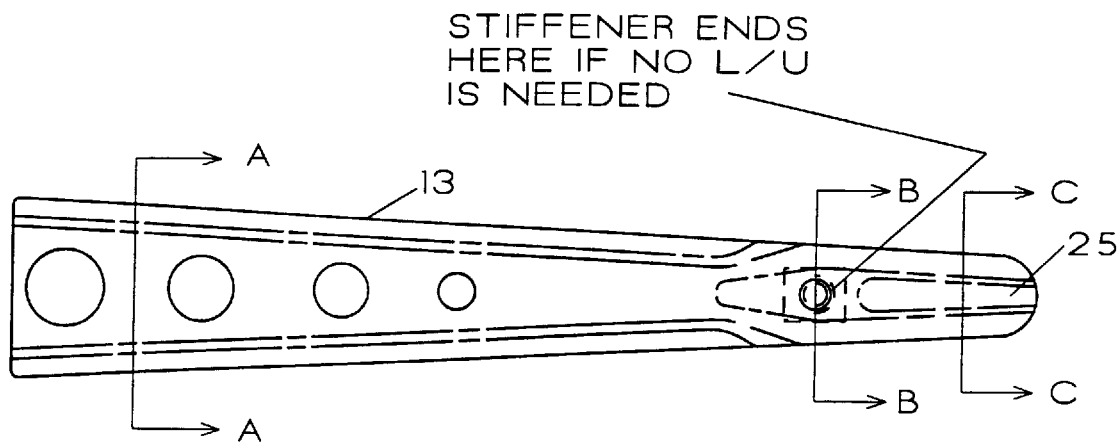
FIG. 8
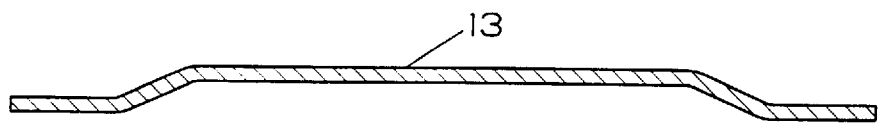
FIG. 8(A)
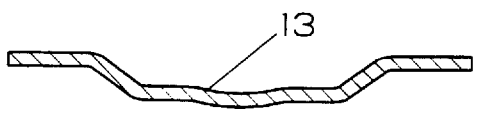 
FIG. 8(B)          FIG. 8(C)
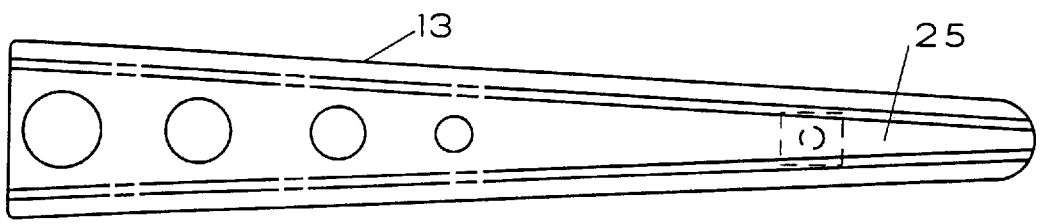
FIG. 9

PLANAR HGA FOR PICO/NANO SLIDER

This application is a continuation of application Ser. No. 08/618,673, filed Mar. 19, 1996, now abandoned.

TECHNICAL FIELD

This invention relates to a slider-suspension assembly for data recording disk files. In particular, the invention relates to an improved head gimbal slider-suspension assembly (HGA) for use with very small sliders, such as Pico-sized or Nano-sized.

BACKGROUND OF THE INVENTION

Disk files are information storage devices which use at least one rotatable disk with concentric data tracks containing the information. Also included is a transducer for reading data from or writing data to various tracks on the rotatable disk. A head or transducer-positioning actuator connected to the head for moving it to the desired track and maintaining it over the track's central line during read or write operations is also included.

The transducer is attached to a slider which has an air-bearing surface. This surface rides on a cushion of air that is generated when the disk is rotating. The surface of the slider opposite to the air-bearing surface is attached to the suspension, and the suspension is attached to a support of the head-positioning actuator. A Pico-size slider may be 1.25 mm×1 mm×0.3 mm thick. The exact size of the Pico slider has not yet been firmly standardized. However, the examples given indicate the order of magnitude and it is clear that one has to deal with apparatus having extremely small dimensions.

The suspension provides dimensional stability between the slider and the actuator arm. It controls flexibility in pitch-and-roll motion of the slider relative to its direction of motion on the rotating disk. The suspension also provides resistance to yaw motion.

Typically, a suspension provides a load or force against the slider which is directed against the force of the air bearing between the slider's air-bearing surface and the disk surface. In this manner, the slider is maintained in extremely close proximity to—but out of contact with—the data surface of the disk.

Conventional suspensions typically are comprised of a load beam, which is mounted at one end to the actuator arm, and a flexure element or flexure which is attached to the other end of the load beam and supports the slider. The flexure element generally has a gimbal arrangement for permitting the slider to assume the respective different angular positions with respect to the data surface of the rotating disk.

The load beam provides the resilient spring action which biases the slider toward the surface of the disk, while (as noted above) the flexure provides flexibility for the slider as the slider rides on a cushion of air between the air-bearing surface and the rotating disk. Such a suspension is described in U.S. Pat. No. 4,167,765, assigned to the same assignee as the present application. A conventional slider is described in U.S. Pat. No. 3,823,416, also assigned to the same assignee as the present application.

The design of a suspension for a Pico-sized slider is particularly difficult due to the load gimbal stiffness, the size of the slider bonding pad, and the desire to utilize as much of the disk's real estate as possible. Furthermore, such a suspension must be robust so as to be able to withstand rough handling and shipping damage, among its other concerns. The gimbal design is also demanding because the required pitch-and-roll stiffness, including wires, have to be of the order of 60 mN-mm/Rad. A Nano-sized slider's requirements are twice or even three times higher.

The normal way of reducing stiffness is to make the gimbal features thinner, about 0.020 mm thick, and longer. This leads to fragility and because of the larger features, it also does not properly utilize the available disk's real estate areas. It is obvious that fragility is undesirable because it would be unable to withstand shock and handling damage. Furthermore, if a thin separate flexure is welded to the load beam, distortions can occur because of heat dissipation and clamping forces. Obviously, the handling of very small pieces may also pose additional difficulties.

An integral flexure approach has been developed which avoids these problems by using laminated suspensions. In the laminated suspensions, the electrical lead lines are integrated in the load beam so that the wiring issue is already taken care of. An integral flexure is a flexure that is a single piece with the load beam and not a separate part that is added to the load beam and welded thereto.

The laminated suspensions generally includes three layers, such as steel, insulating polyimide and copper. The electrical lead lines can be etched into the copper layer, while the polyimide layer can provide insulation. The steel layer can also be etched to provide strength characteristics for the suspension.

One of the problems in using the laminated suspensions of the above-noted type is the fact that such three-layer material is not well suited for a stamping/fabricating process. For example, in some suspensions it is also desirable to be able to stamp some formed portions, such as a pivoting dimple or flanges to provide rigidity to the overall suspension structure.

There are also other problems which arise when there is a need for unloading the suspension from the disk file for shipping or to avoid shock. For this purpose, a tab may be provided on the suspension so that the slider-suspension assembly can be moved outside the disk's real estate to prevent disk damage by the slider.

SUMMARY OF THE INVENTION

The invention is directed to an improved slider-suspension assembly which overcomes the disadvantages noted above for Pico-sized sliders.

An embodiment of the present invention includes a slider-suspension assembly for use with Pico-sized and Nano-sized sliders for a data disk file. The assembly includes a laminated load beam having a plurality of layers, adapted to have a slider mounted at one end thereof opposite the file actuator support. The laminated beam has at least one electrically conductive layer in which electrical lead lines have been formed for connection to the slider. A stiffener member is attached to the laminated load beam to provide stiffening to the overall assembly. The stiffener member is capable of being fabricated into a desired shape by a stamping process.

In a further preferred embodiment of the present invention, the electrical lead lines are etched into the electrically conductive layer to provide connections between the slider and the load arm actuator support.

In another embodiment, the stiffener member may be attached to the steel layer of the load beam and be provided in an elongated form having flanges of substantially Z-shaped cross-section.

In still another embodiment the stiffener member arrangement can be formed with a dimple adapted to contact the slider for providing appropriate motion of the assembly with respect to the slider.

For full understanding of the nature and advantages of the present invention, reference should be made to the following detailed description, taken in conjunction with the accompanying drawings.

BRIEF DESCRIPTION OF THE DRAWINGS

FIG. 1(A) is a plan view of the slider-suspension assembly, with a portion removed to show the connections to the slider, while FIG. 1(B) is a side view of FIG. 1(A);

FIG. 2 is a sectional view taken along the lines II—II of FIG. 1(A);

FIG. 8 is a plan view of a further embodiment of the stiffener member, while FIGS. 8(A), 8(B), and 8(C) are sub-figures taken along the cross-sectional lines A—A, B—B, C—C, respectively;

FIG. 9 is a plan view of the stiffener member showing a tab at the end thereof, useful for loading and unloading the assembly from the disk file mechanism.

DESCRIPTION OF THE INVENTION

Figure 3:
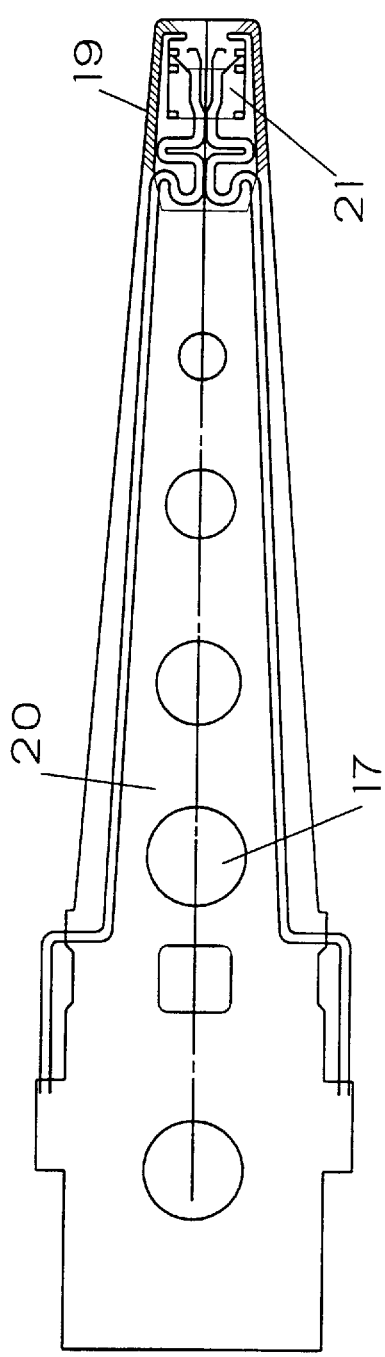
FIG. 3 is a plan view of the laminated load beam, with the end to which the slider is attached shown in section.

Referring to the drawings and, more particularly the FIGS. 1–3, it can be seen that the load beam 20 is made up of a steel substrate 10, an insulating polyimide layer 11, and a copper layer 12. Mounted on the upper steel layer 10 is the stiffener 13. The stiffener 13 is mounted on the load beam 20 by means of welding, with weld spots 16 being distributed along the outer edge portions of the stiffener.

It can be seen that the weld spots 16 are spaced away from the edge of the load beam 20 containing the slider and its connections thereto. This is the rigid section of the suspension, away from the gimbal area. Accordingly, the gimbal has no weldment distortions. Relief holes 17 are included both in the stiffener and in the load beam 20 to reduce mass. The locations of the relief holes, as well as the locations of the weld spots 16, can be tailored to optimize dynamics. As will be subsequently explained, the stiffener 13 can be formed with several different cross-sectional arrangements.

As can best be seen in FIG. 2, the stiffener 13 in this environment includes flanges 18 which are generally Z-shaped. The steel layer 10 is partially etched at the slider end and has a flexure 19 due to such partial etching (FIG. 3). The slider itself, shown in outline 30 (FIG. 1B), is connected to the load beam by connecting to the slider bonding pad 21.

Figure 5A:
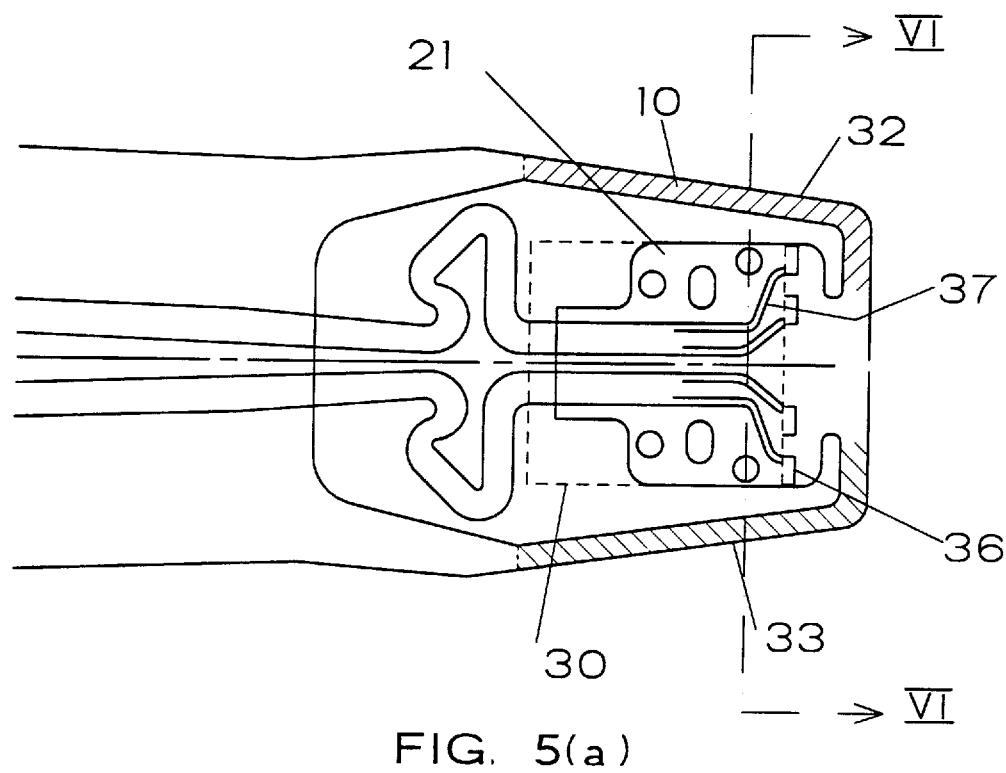
FIG. 5 is an enlarged view of the end of the load beam attached to the slider showing the flexure element formed in the load beam.
Figure 5B:
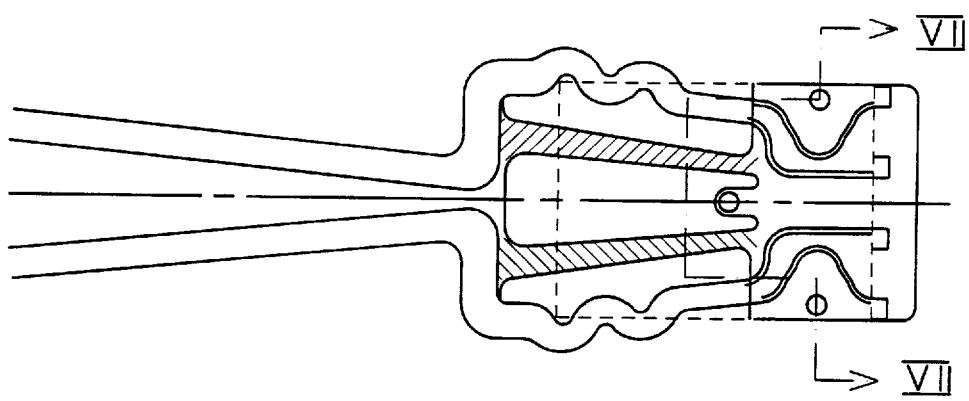

Referring to FIG. 5(a), an enlarged view of the slider end of the assembly is shown. In this arrangement, the steel layer 10 has been partially etched away to form the flexure elements 32 and 33, and the bonding pad 21. As can be seen from the dotted outline, the slider 30 is supported by the bonding pad 21. Also shown in FIG. 5(a) are pads 36 to provide electrical connection to the head transducer as well as the copper traces 37 connected thereto. The copper traces 37 transmit electric signals from the transducer to the head-actuating mechanism at the other end of the load beam.

Figure 6:
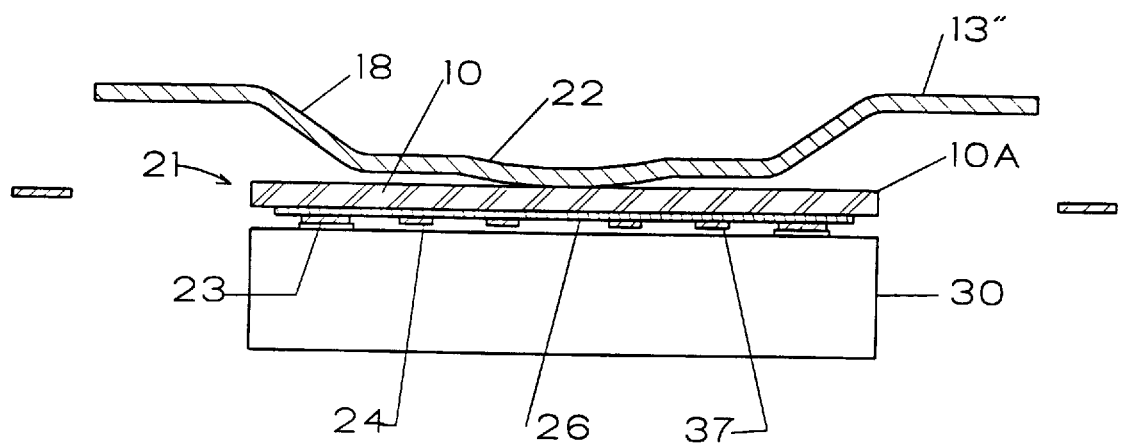
FIG. 6 is a cross-sectional view, taken along the line VI—VI of FIG. 5(a) and including the stiffener member of FIG. 4.

The bonding pad 21 can also be seen in FIG. 6 which is a cross sectional view taken along the line VI—VI of FIG. 5(a). Here the stiffener 13' is shown formed with flanges 18 and has a generally Z-shaped cross section. Stiffener 13' also has a formed dimple 22 in the center thereof. The dimple 22 rides on the steel layer 10 arranged above the insulating polyimide layer 11. The steel layer 10 forms the upper surface 10A of the slider bonding pad, while the copper layer 12 has copper pads 23 for making mechanical contact with a solder spacing bump 24.

The copper layer 12 also has etched therein copper traces 37 which are used for making electrical connections to the slider. Thus, the slider bonding pad 21 includes the upper surface 10A and the lower surfaces 26 and 24. The surface 24, as noted above, is a spacer formed on copper pad 23. The slider 30 is bonded to the lower surfaces of the bonding pad. For this purpose, a suitable adhesive is used, such as Blackmax, manufactured by the Loctite Corporation. A cross-section of the adhesive is not shown in order to avoid unnecessarily complicating the drawing, since this is done in a conventional manner.

Figure 4:
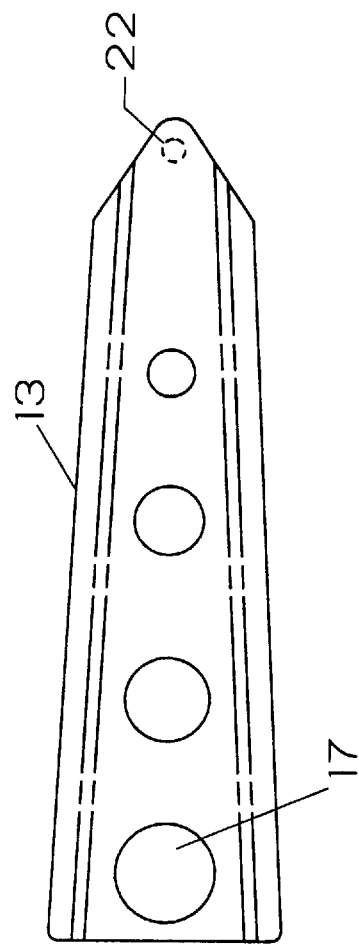
FIG. 4 is a plan view of the stiffener member, showing where a dimple can be formed during the stamping process.

From FIG. 6, it can be seen that the stiffener member can be formed by a stamping process to produce the shape, including the dimple. A plan view of the stiffener 13 is shown in FIG. 4, where the location of the dimple 22 is indicated as being right above the slider bonding pad 21. As noted above, the stiffener 13 is welded to the steel layer 10 of the load beam.

An assembly includes a laminated load beam that has an integral flexure built in and a separate stiffener piece connected to the load beam. The load beam has no formed areas other than the hinges that are used for preload. The load beam is etched in a planar material that usually is made of a steel substrate 10 and can be from 0.018 to 0.0762 mm thick. The intermediate insulating dielectric layer 11 can be from 0.005 to 0.0254 mm thick in this embodiment, while the conductor copper layer 12 can be from 0.0127 to 0.0381 mm thick. It is clear that other thicknesses can also be accommodated. A load beam that has performed satisfactorily had a steel substrate 10, 0.0508 mm thick, a insulator layer 11, 0.018 mm thick and a copper layer 12, 0.0178 mm thick.

To develop the gimbal area for supporting the slider bonding pad 21 and the slider 30, a partial etching in the steel layer 10 to about half its thickness can be carried out. In FIG. 3, it can be seen that the flexure legs 19 run around the trailing end corners of the slider. This is very important to maintain the required stiffness needed for Pico-sized sliders.

The slider bonding pad 21, noted above, is provided at the end of the flexure legs. The size of the slider bonding pad matches the slider area for maximum ease of slider bonding. In this manner, there is no gimbal feature in danger of being affected adversely by adhesive oozing. As indicated in FIG. 6, the slider bonding pad 21 provides the resting surface for the dimple 22 of the stiffener member 13.

In order to form a gap between the copper layer and the slider, solder bumps are deposited on copper pads under the lower bonding surface of the bonding pad. This gap is needed to avoid electrically shorting the copper traces that are used for carrying electrical signals from the transducer mounted in the slider to the electronics connected to the head-actuating means.

The copper traces 37 forming the electrical conductors span the hinge 40 (FIG. 1A) by exiting on the sides of the load beam 20 and running around the mount plate (not shown). This avoids squeezing the copper traces 37 between the plate and the load beam 20 if a mount plate is used to attach the suspension to the arm (not shown). Otherwise, the copper traces can span the hinge 40, running between them by using a gentle loop midway to better absorb the hinge-forming curvature changes.

In the above-noted embodiment, the stiffener 13 can be a separate steel piece, 0.0305 mm (1.2 mil) or 0.0635 mm (2.5 mil) thick. As shown in FIGS. 1 and 6, the stiffener 13 and 13' has flanges 18 formed in a "Z" fashion with simple bends which run longitudinally to form the stiffening ribs. A dimple 22 can be stamped at the slider end, as shown in FIGS. 4 and 6.

Figure 7:
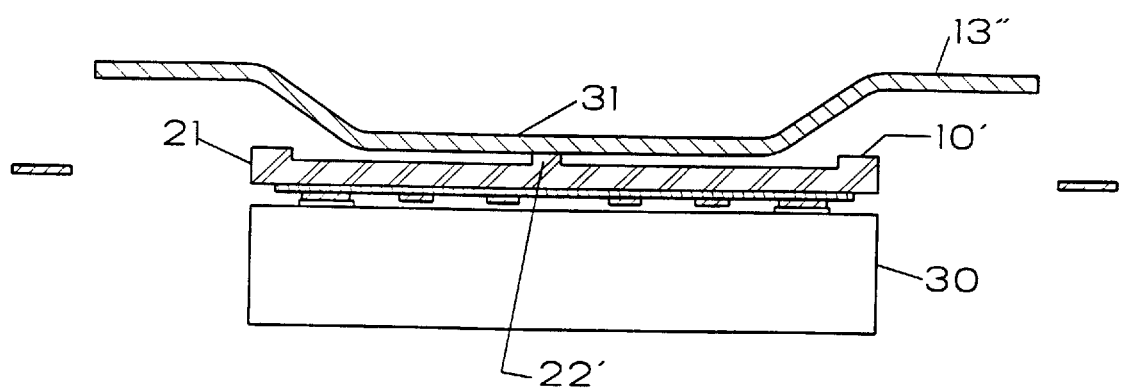
FIG. 7 is a cross-sectional view, taken along the line VII—VII of FIG. 5(b)

A different arrangement for the stiffener and the slider bonding pad is shown in the cross-sectional view of FIG. 7. Here the stiffener 13" is arranged without a dimple and has a substantially flat surface 31, substantially parallel to the top surface of the slider 30. In this arrangement, the steel layer 10' has been partially etched away at the slider bonding pad area 21' so that only a small area in the center forms, effectively, a partially etched dimple 22' in the slider bonding pad 21'. The surrounding partially etched area provides clearance needed for gimbaling to permit the tilting of the slider 30.

For the suspension shown in FIG. 1, the solid height is the sum of the slider 30 thickness (0.3 mm), the solder bump spacer 24 (0.015 mm), the laminate thickness (0.0508 mm steel substrate 10, 0.0165 mm polyimide layer 11, 0.0178 mm copper layer 12), the dimple 22 height (0.025 mm), the stiffener 13 thickness (0.0381 mm), and the flanges 18 height (0.125 mm). Thus, the solid height is a total of 0.588 mm.

This solid height of the suspension can be reduced in several ways. If the preload is not too high, on the order of 4 gm or less, the height of the flanges 18 of the stiffener 13 can be cut to 0.1 mm. In the illustrated embodiment, the suspension has a length of 18.04 mm from the dimple to the swage hole center. If the suspension is shorter, an even shallower height flange 18 height can be contemplated for the stiffener 13.

The arrangement shown in FIG. 7, which partially etches away the steel 10' in the bonding pad 21' area, will provide a lower overall height since the dimple 22' formed in the stiffener 13" is contained in the thickness of the steel substrate 10'. The partially etched area around the center of the top surface of the steel bonding pad 21' provides the clearance, as noted above, for the gimbaling. The formed dimple 22, as shown in FIG. 6, is removed from the stiffener 13" and its height is removed from the list of solid height contributors. Alternatively, the bonding pad 21' itself can be partially etched to a smaller thickness so that the dimple rests on the reduced thickness bonding pad 21'. Then the partial etch thickness of the steel substrate 10', will be the only contribution of the steel substrate 10' to the overall solid height.

If the disk's real estate will permit, the copper traces 37 for providing the electrical connections from the slider 30 to the electronics of the head-actuating member can be routed outside the slider border (not shown). This will save the thickness of the polyimide 11 and the copper 12 layers.

FIG. 8, including sub-FIGS. 8(A), 8(B), and 8(C), shows a different arrangement for the stiffener 13. In this arrangement, as can be seen in FIG. 8(A), the stiffener 13 will form essentially a box-shaped cross-section with the load beam 20 that is arranged below FIG. 8(A). FIG. 8(B) shows the dimple 22 arrangement provided at the bond pad 21 of the stiffener 13. In the stiffener 13 shown in FIGS. 8 and 9, the stiffener 13 has been extended beyond the bond pad 21 to provide a load/unload tab 25. FIG. 8(C) is a cross-section of the load/unload tab 25 of the stiffener 13.

Figure 10:
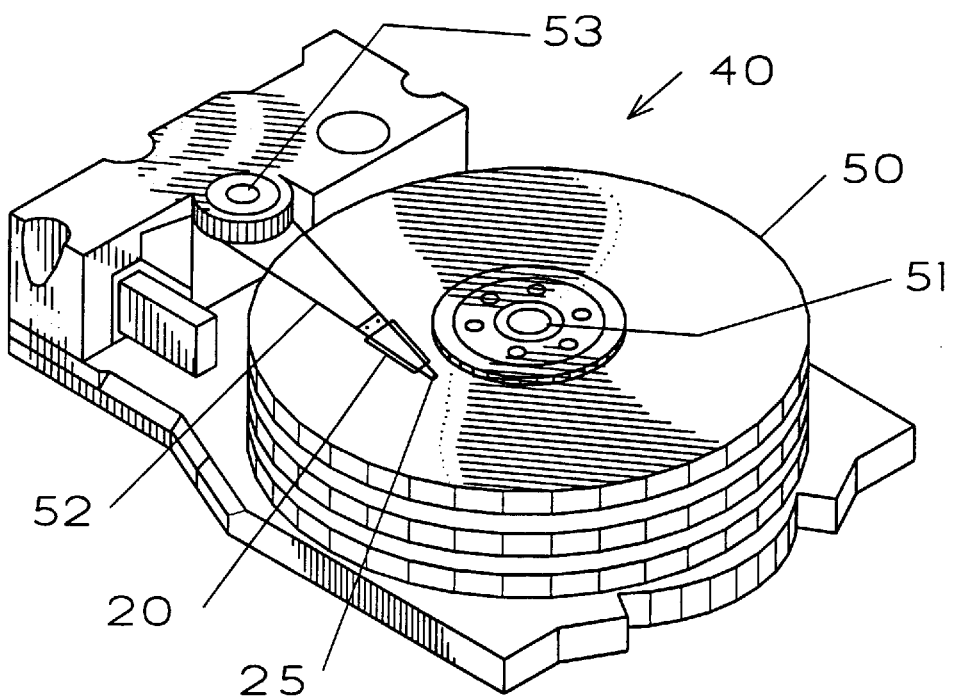
FIG. 10 is a perspective view of a magnetic disk device using a slider-suspension assembly of the type shown in FIG. 1.

Referring now to FIG. 10, the slider-suspension assembly 20 of FIG. 1 is shown mounted in operative relationship with a magnetic disk data storage system 40 having a plurality of disks 50. While the assembly 20 is shown facing the upper surface of the top disk 50 it can be appreciated that each of the disks 50 has a separate assembly. Of course, only a single magnetic disk may be used with a single slider-suspension assembly depending on the storage and space requirements.

As is well known, each of the disks 50 has a plurality of concentric data tracks. The disks are mounted on a spindle shaft 51 which is connected to a spindle motor (not shown). The assembly 20 is mounted on an actuator arm 52 in turn coupled to an actuator 53. The actuator 52 moves the arm or arms 52 in a radial direction across the respective disk when data is to be read from or written on to the disk.

The load/unload tab 25, as mentioned above, is utilized when it is desired to move the slider away from the rotating disk 50, when the apparatus is not being used, or when the apparatus is being shipped or otherwise mechanically handled. This avoids any mechanical damage to the sensitive slider 30 and flexure elements 32 and 33.

It should be appreciated that the invention can be easily extended to the Nano-sized slider in the various versions available. The utilization of the disk's real estate is improved in the case of the Nano-sized slider because the flexure elements 32 and 33 can be contained within the slider 30 footprint. It is clear that the present invention can also be applied to conventional suspensions having discrete wires rather than etched copper traces 37.

In the above manner, it is seen that a head gimbal assembly can be provided which includes the advantages of size and the strength of the load beam 20 combined with the stiffener 13 which may be formed by a stamping process.

An additional requirement arises when there is a need for a ship/shock and static friction protection in the disk file. Usually, this is taken care of by adding a load/unload tab 25 to the suspension. This tab slides on a ramp outside of the periphery of the disk and allows the suspension to move outside the disk, thereby preventing disk damage by the slider 30. As noted above, the load/unload tab is connected to the rigid section of the stiffener 13, which is attached to the load beam 20, and extends above the slider 30 a certain distance beyond its trailing edge. The load/unload tab 25 is located above the slider 30 in order to save disk real estate. However, because it is above, it adds to the solid height of the suspension. It should be noted that the measurement of solid height is the distance from the air-bearing surface of the slider 30 to the most distant suspension feature above the slider 30.

While the preferred embodiments of the present invention have been illustrated in detail, it should be apparent that modifications and adaptations to those embodiments may occur to those skilled in the art without departing from the spirit and scope of the present invention as set forth in the following claims.

What is claimed is:

1. A slider-suspension assembly for use with pico-size and nano-sized sliders for a data recording disk file, said assembly comprising:

a laminated load beam having a plurality of layers adapted to have a slider mounted at one end thereof and adjacent but spaced from a surface of a rotatable disk of said disk file, said laminated load beam having at least one electrically conductive layer in which electrical lead lines have been formed for connection to said slider; and a stiffener member attached to said laminated load beam to provide stiffening to said assembly, said stiffener member being capable of being fabricated into a desired shape by a stamping process, wherein said load beam has a slider bonding pad arranged at said one end thereof, said pad having an upper surface adapted to contact said stiffener member and a lower surface adapted to contact said slider, and wherein said slider bonding pad has an upper surface that is thinner in its central area and thicker in its side areas and is formed with a raised portion substantially at the center of said central area and said stiffener member has a substantially planar bottom end surface for contacting said raised portion of said pad.

2. A magnetic disk data storage system wherein a suspension arm supports and positions a head/slider combination to specific tracks at particular radii of a magnetic disk having a plurality of surfaces and wherein said head/slider combination is electrically connected to external control circuitry, said suspension arm and head/slider assembly comprising:

a laminated load beam having a plurality of layers adapted to have a slider mounted at one end thereof and adjacent but spaced from one of said surfaces of said magnetic disk, said laminated beam having at least one electrically conductive layer in which electrical lead lines have been formed for connection to said slider; and a stiffener member attached to said laminated load beam to provide stiffening to said assembly, said stiffener member being capable of being fabricated into a desired shape by a stamping process, wherein said load beam has a slider bonding pad arranged at said one end thereof, said pad having an upper surface adapted to contact said stiffener member and a lower surface adapted to contact said slider, and wherein said slider bonding pad has an upper surface that is thinner in its central area and thicker in its side areas and is formed with a raised portion substantially at the center of said central area and said stiffener member has a substantially planar bottom end surface for contacting said raised portion of said pad.

* * * * *